United States Patent
Sato et al.

(10) Patent No.: US 7,115,237 B2
(45) Date of Patent: Oct. 3, 2006

(54) EXHAUST GAS PURIFYING METHOD AND EXHAUST GAS PURIFYING SYSTEM

(75) Inventors: Hitoshi Sato, Fujisawa (JP); Naofumi Ochi, Fujisawa (JP); Masashi Gabe, Fujisawa (JP); Takehito Imai, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 498 days.

(21) Appl. No.: 10/659,252

(22) Filed: Sep. 11, 2003

(65) Prior Publication Data

US 2004/0105801 A1 Jun. 3, 2004

(30) Foreign Application Priority Data

Sep. 20, 2002 (JP) .............................. 2002-274750

(51) Int. Cl.
*F01N 3/08* (2006.01)
*B01D 53/94* (2006.01)
*B01D 53/86* (2006.01)
*B01D 53/04* (2006.01)

(52) U.S. Cl. .............................. 423/213.2; 423/215.5; 423/245.3

(58) Field of Classification Search ............. 423/213.2, 423/215.5, 245.3; 422/105
See application file for complete search history.

(56) References Cited

U.S. PATENT DOCUMENTS 3,872,666 A * 3/1975 Bentley ........................ 60/277
5,451,385 A * 9/1995 Hansel et al. ............. 423/213.5
5,458,862 A * 10/1995 Glawion ................... 423/245.3
5,772,972 A * 6/1998 Hepburn et al. .......... 423/213.5
5,887,422 A * 3/1999 Abe et al. ...................... 60/274
6,074,973 A * 6/2000 Lampert et al. ............... 502/60
6,168,764 B1* 1/2001 Boegner et al. ............ 422/177
6,274,107 B1* 8/2001 Yavuz et al. .............. 423/213.5
6,334,306 B1* 1/2002 Mori et al. .................... 60/297
6,401,450 B1* 6/2002 Hoshi ........................... 60/277
6,797,517 B1* 9/2004 Hoshi et al. ................... 436/37

FOREIGN PATENT DOCUMENTS

EP          1400664 A1 *   3/2004
JP        2000-352303     12/2000

* cited by examiner

*Primary Examiner*—Colleen P. Cooke
(74) *Attorney, Agent, or Firm*—Staas & Halsey LLP

(57) ABSTRACT

To provide an exhaust gas purifying method for purifying the exhaust gas of an internal combustion engine (1) by an exhaust gas purifying system (10) having an oxidation catalyst (3a), which comprises the steps of estimating the quantity of unburnt hydrocarbon accumulated in a support of the oxidation catalyst (3a), performing a hydrocarbon removal control when an estimated accumulation quantity (Vhc) of the unburnt hydrocarbon exceeds a predetermined judgment value (Vhc0) and raising an exhaust gas temperature (T) to activate the oxidation catalyst (3a) and oxidizing and removing the accumulated unburnt hydrocarbon.

Thereby, it is possible to prevent a white fume from being produced after a low exhaust temperature state of an idling operation or the like continues for a long time.

4 Claims, 7 Drawing Sheets

(a)

(b)

$T(R0) < T(R1) < T(R2) < T(R3)$

EXHAUST GAS PURIFYING METHOD AND EXHAUST GAS PURIFYING SYSTEM

BACKGROUND OF THE INVENTION

The present invention relates to an exhaust gas purifying method and an exhaust gas purifying system for purifying the exhaust gas of an internal combustion engine by using an oxidation catalyst. More particularly, the present invention relates to an exhaust gas purifying method and an exhaust gas purifying system capable of preventing an unburnt hydrocarbon accumulated in an oxidation catalyst due to a long-time idling operation from being exhausted into the atmosphere.

The quantity of a particulate matter (hereafter referred to as PM) exhausted from a diesel internal combustion engine has been more strictly regulated year by year together with NOx, CO, and HC. Therefore, a technique has been developed which reduces the quantity of PM to be exhausted to the outside of the system by collecting the PM with a filter referred to as a diesel particulate filter (hereafter referred to as DPF).

A PM-collecting DPF includes a ceramic such types as a monolith-honeycomb wall-flow filter and a fibrous filter formed by fibrous ceramic or metal. An exhaust gas purifying system using one of these DPFs is set in the middle of the exhaust passage of an internal combustion engine the same as the case of other exhaust gas purifying systems to purify and exhaust the exhaust gas produced in the internal combustion engine.

These DPF systems include a continuous regenerating DPF type referred to as a CRT (Continuously Regenerating Trap) provided with an oxidation catalyst (DOC: Diesel Oxidation Catalyst) on the upstream side of a DPF system and a DPF type referred to as a CSF (Catalyst Soot Filter) for burning PM with an exhaust gas by lowering the combustion temperature of the PM in accordance with the action of a catalyst carried by a filter.

The CRT-type continuous regenerating DPF system uses the fact that PM is oxidized with $NO_2$ (nitrogen dioxide) at a lower temperature than oxidizing the PM with oxygen in an exhaust gas, which is constituted of an oxidation catalyst and a filter. The PM is removed by oxidizing NO (nitrogen monoxide) in an exhaust gas to produce $NO_2$ on the upstream-side oxidation catalyst carrying platinum and oxidizing the PM collected in a downstream-side filter with the $NO_2$ to produce $CO_2$ (carbon dioxide).

Moreover, the CSF-type continuous regenerating DPF system is constituted of a catalyst-provided filter with such a catalyst as cerium oxide ($CeO_2$). Furthermore, at a low temperature (300° C. to 600° C.), PM is oxidized utilizing a reaction such as ($4CeO_2+C \rightarrow 2Ce_2O_3+CO_2$, $2Ce_2O_3+O_2 \rightarrow 4CeO_2$) using $O_2$ (oxygen) in the exhaust gas in the catalyst-provided filter. When PM is kept in a high temperature zone higher than the temperature at which the PM is burned with $O_2$ in an exhaust gas (such as 600° C. or higher), the PM is oxidized with $O_2$ in the exhaust gas.

Also, in the CSF-type continuous regenerating DPF system, PM is oxidized and removed by setting an oxidation catalyst on the upstream side of the system, oxidizing unburnt HC and CO in exhaust gas, and raising an exhaust gas temperature while preventing the HC and CO from being exhausted into the atmosphere.

However, in the case of a low exhaust temperature or an operation of low NO exhausted, also in these continuous regenerating DPF systems, a catalyst temperature is lowered and thereby a catalyst activity is deteriorated or NO runs short. Therefore, the above reaction does no occur. Therefore, because a filter cannot be regenerated by oxidizing PM, deposition of the PM on the filter is continued and the filter is clogged.

Therefore, in the case of these continuous regenerating DPF systems, regeneration control for oxidizing and removing PM collected in a filter is performed by estimating a deposited PM quantity in accordance with the differential pressure between a upstream and a downstream of a DPF when regenerating the filter, changing the present operation state of an internal combustion engine to a regenerating-mode operation when the differential pressure exceeds a predetermined judgment value, and forcibly raising the exhaust temperature or increasing the quantity of NO or $NO_2$.

However, when the idling operation of or a low-exhaust-temperature state of an internal combustion engine such as a low-load low-engine-speed operation is continued, an oxidation reaction is not accelerated because the temperature of exhaust gas is low and the temperature of an oxidation catalyst is lowered and thus, the catalyst is not activated. Therefore, the unburnt HC (hydrocarbon) produced under the above operation state is adsorbed and accumulated in a lot of holes on the surface of a carrier such as an alumina of an oxidation catalyst set in an exhaust passage.

Then, when this low-exhaust-temperature state continues for a long time (e.g. 4 hr) with the unburnt HC (hydrocarbon) in a state close to an accumulation limit value, and the present operation is shifted to a high-load operation by pressing the accelerator, the flow rate of exhaust gas increases before the temperature is raised up to a zone in which an oxidation catalyst is activated. Therefore, a problem remains that the unburnt HC accumulated in an oxidation catalyst carrier is exhausted into the atmosphere in a form of a white fume.

Coping with the above problem, in the case of a conventional engine-exhaust-gas purifying system, for example as disclosed in the Japanese Patent Laid-Open No.2000-352303 (page.2–3), it is prevented that a white fume of unburnt HC is produced at a time of no-load operation after idling or start of an engine by changing switching valves whenever an idling state continues for a predetermined judgment time or longer, changing DPFs for passing exhaust gas, and heating the DPF on the side where passing of exhaust gas is interrupted by a heating means such as an electric heater to oxidize and remove the exhaust gas.

In the case of the exhaust gas purifying system, however, because a filter is heated up to a high temperature by setting heating means such as an electric heater to the filter, another system such as a heater for heating the filter is required. Moreover, because a catalyst action is not used, a higher temperature for an oxidation of unburnt HC is required and a comparatively high temperature is necessary for heating, leaving a problem of fuel efficiency deterioration.

BRIEF SUMMARY OF THE INVENTION

The present invention is made to solve the above problems and its object is to provide a exhaust gas purifying method and a exhaust gas purifying system capable of preventing white fume from being produced after a low-exhaust-temperature state of the idling operation or the like continues for a long time by raising an exhaust gas temperature when the estimated accumulated unburnt-HC quantity adsorbed by the oxidation catalyst carrier exceeds a predetermined judgment value and oxidizing and removing the HC on the oxidation catalyst in an exhaust gas purifying system having an oxidation catalyst on the exhaust passage of an internal combustion engine.

The exhaust gas purifying method for achieving the above object is an exhaust gas purifying method for purifying the exhaust gas of an internal combustion engine in an exhaust gas purifying system provided with an oxidation catalyst, in which a quantity of unburnt hydrocarbon accumulated in an oxidation catalyst carrier is estimated, the oxidation catalyst is activated by performing a hydrocarbon removal control and thereby raising an exhaust gas temperature to activate the oxidation catalyst when an estimated accumulated unburnt hydrocarbon quantity exceeds a predetermined judgment value, and the accumulated unburnt hydrocarbon is oxidized to be removed.

According to an exhaust gas purifying method of the present invention, when the quantity of unburnt HC accumulated due to a long-time idling operation or a low-exhaust-temperature state of a small-load and low-engine-speed operation or the like increases, accumulated unburnt HC is oxidized and removed by an oxidation catalyst activated by performing a hydrocarbon removal control and forcibly raising an exhaust gas temperature. Therefore, a white fume produced during a high-load operation after a low-exhaust-temperature operation is prevented from being produced.

Moreover, because the exhaust gas purifying method uses the catalyst action of an oxidation catalyst and a temperature of an exhaust gas is required to raise up equal to or higher than an activation temperature (approx. 250° C.) for an oxidation catalyst, therefore an unburnt HC can be oxidized at a comparatively low energy.

Furthermore, in the case of the above exhaust gas purifying method, wherein a judgment is made as to whether the accumulated value of periods in which an internal combustion engine is kept in a low exhaust temperature state is equal to or more than a predetermined judgment value, instead of judging whether the estimated accumulated unburnt-hydrocarbon quantity exceeds the predetermined judgment value or not. Thereby, it is possible to control a comparatively simple device such as a timer and a judgment algorithm.

A low exhaust temperature state denotes an operation state at a low exhaust temperature in which unburnt HC is accumulated in an oxidation catalyst without being oxidized.

Moreover, the hydrocarbon removal control raises an exhaust gas temperature by performing a multistage fuel injection in an internal combustion engine. Thereby, it is not necessary to use another heating device such as an electric heater and it is possible to reduce the fuel cost without requiring a high energy produced by the electric heater.

Moreover, an exhaust gas purifying system for executing the above exhaust gas purifying method is an exhaust gas purifying system having an oxidation catalyst and purifying the exhaust gas of an internal combustion engine, which is constituted of an accumulated-hydrocarbon-quantity judgment means for estimating the quantity of unburnt hydrocarbon accumulated in the oxidation catalyst carrier and judging whether the estimated accumulation quantity of the unburnt hydrocarbon exceeds a predetermined judgment value and a hydrocarbon removal control means for activating the oxidation catalyst by raising an exhaust gas temperature to activate the oxidation catalyst when the accumulated-hydrocarbon-quantity judgment means judges that the estimated accumulation quantity exceeds the predetermined judgment value and oxidizing the accumulated unburnt hydrocarbon to remove.

Furthermore, in the case of the above exhaust gas purifying system, the accumulated-hydrocarbon-quantity judgment means judges whether an accumulated value of periods in which the internal combustion engine is kept in a low exhaust gas temperature state becomes a predetermined judgment value or more, instead of judging whether the estimated accumulation quantity of the unburnt hydrocarbon exceeds a predetermined judgment value.

Furthermore, in the case of the above exhaust gas purifying system, the hydrocarbon removal control means is constituted so as to perform a control for raising an exhaust gas temperature by performing a multistage fuel injection in an internal combustion engine.

Furthermore, as a continuous regenerating DPF system,: there are systems such as a system constituted by making a filter carry an oxidation catalyst, a system constituted by setting an oxidation catalyst to the upstream side of a filter, and a system constituted by making a filter carry a catalyst and setting an oxidation catalyst on the upstream side of a filter.

As described above, an exhaust gas purifying method and an exhaust gas purifying system of the present invention make it possible to forcibly raise an exhaust gas temperature by performing an unburnt HC removal control when the quantity of unburnt HC accumulated in an oxidation catalyst increases affected by a low exhaust state of a long-time idling operation or low-load low-speed operation. Therefore, it is possible to oxidize and remove the accumulated unburnt HC by an oxidation catalyst heated and activated by a temperature-raised exhaust gas and to prevent a white fume produced during a high-load operation is started after a long-time low-exhaust-temperature operation from being produced.

Moreover, because the exhaust gas purifying method and the exhaust gas purifying system use the catalyst action of an oxidation catalyst, it is possible to oxidize unburnt HC by a comparatively low energy. Therefore, it is only required to raise an exhaust gas temperature up to a temperature equal to or higher than an activation temperature (approx. 250° C.) at which the oxidation catalyst is activated. Moreover, because the exhaust gas temperature is raised through a fuel injection control in an engine, another heating means such as a fuel electric heater is not required.

DETAILED DESCRIPTION OF THE INVENTION

An exhaust gas purifying method and an exhaust gas purifying system of embodiments of the present invention are described below by using an exhaust gas purifying system having a continuous regenerating DPF system provided with a combination of an oxidation catalyst (DOC) and a catalyst-provided filter (CSF) as an example and referring to the accompanying drawings.

Figure 1:
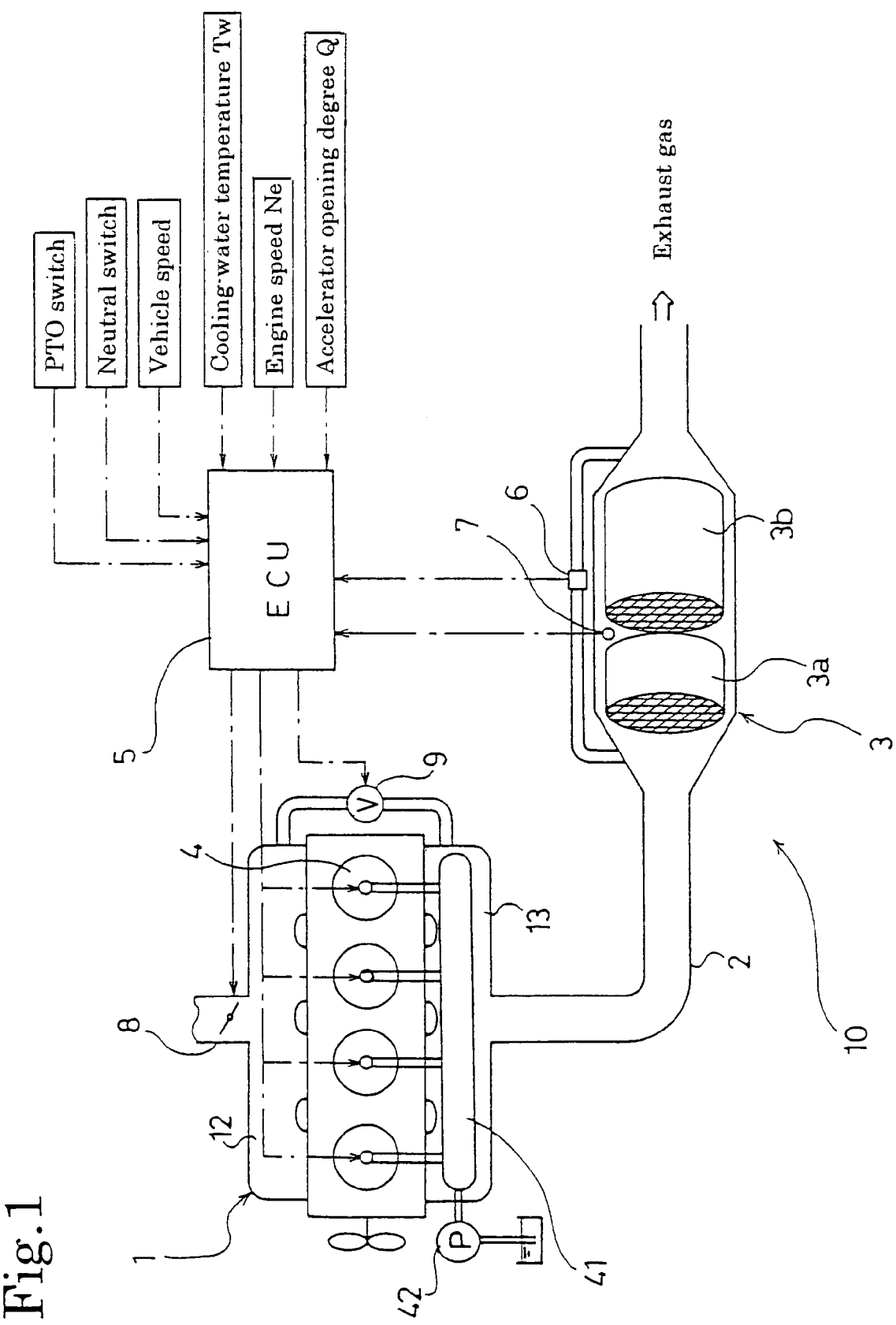
FIG. 1 is a system block diagram of an exhaust gas purifying system according to an embodiment of the present invention.
Figure 2:
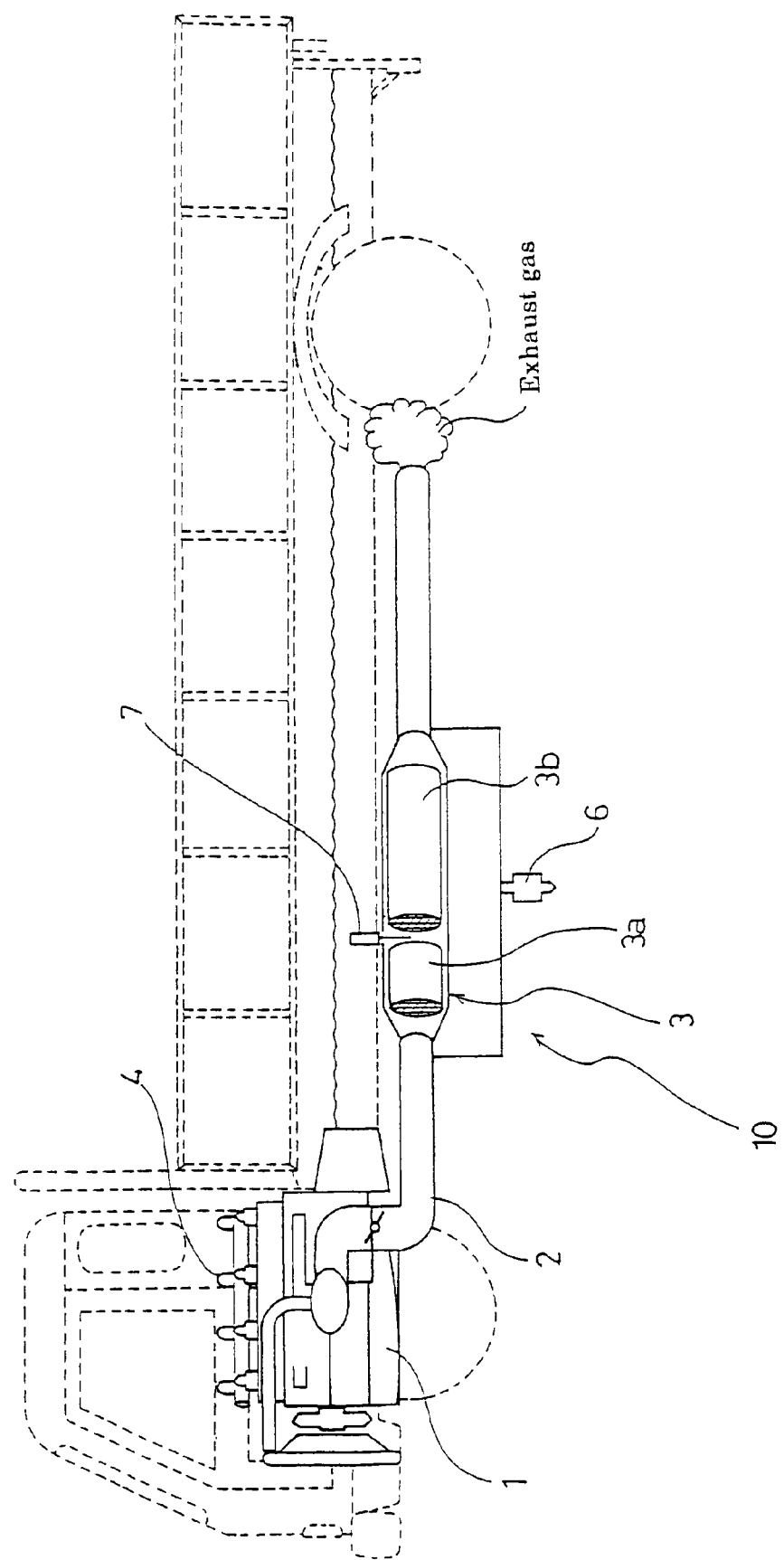
FIG. 2 is an illustration showing a setting state of an exhaust gas purifying system according to an embodiment of the present invention.

FIGS. 1 and 2 show a configuration of an exhaust gas purifying system 10 of an internal combustion engine of the above embodiment. The exhaust gas purifying system 10 of the internal combustion engine is constituted by including a continuous regenerating DPF system 3 which is set to an exhaust passage 2 connected to an exhaust manifold 13 of an engine (internal combustion engine) 1 and in which an oxidation catalyst 3a is set to the upstream side and a catalyst-provided filter 3b is set to the downstream side.

The oxidation catalyst 3a is formed by making a porous ceramic carrier with such a structure as honeycomb type carry an oxidation catalyst such as platinum (Pt). The catalyst-provided filter 3b is formed by a monolith-honeycomb wall-flow filter obtained by alternately closing the inlet and outlet of a porous ceramic honeycomb channel or a pannose filter obtained by laminating inorganic fiber such as alumina at random. The filter portion carries a catalyst such as platinum or cerium oxide.

Then, when using a monolith-honeycomb wall-flow filter for the catalyst-provided filter 3b, a particulate matter (hereafter referred to as PM) contained in an exhaust gas is trapped by a porous ceramic wall. Moreover, when using a fibrous filter, the PM is trapped by inorganic fiber of the filter.

Then, to estimate the PM deposited in the catalyst-provided filter 3b, a differential-pressure sensor 6 is set to a conduction tube connected to the upstream and downstream of the continuous regenerating DPF system 3. Moreover, a temperature sensor 7 is set between the oxidation catalyst 3a and the catalyst-provided filter 3b for regeneration control of the catalyst-provided filter 3b.

Outputs of these sensors are input to a controller (ECU: engine control unit) 5 which performs not only general control of operations of the engine 1 but also regeneration control of the catalyst-provided filter 3b. Control signals output from the controller 5 control a fuel injection system 4 of the engine 1, an intake valve 8 for adjusting an air quantity to be supplied to an intake manifold 12, and an EGR valve 9 for adjusting an EGR quantity.

The fuel injection system 4 is connected to a common rail 41 for temporarily storing a high-pressure fuel boosted by a fuel pump 42. The controller 5 also receives the information on/off of a PTO switch, on/off of a neutral switch, vehicle speed, cooling-water temperature Tw, engine speed Ne, and accelerator opening degree Q.

Figure 3:
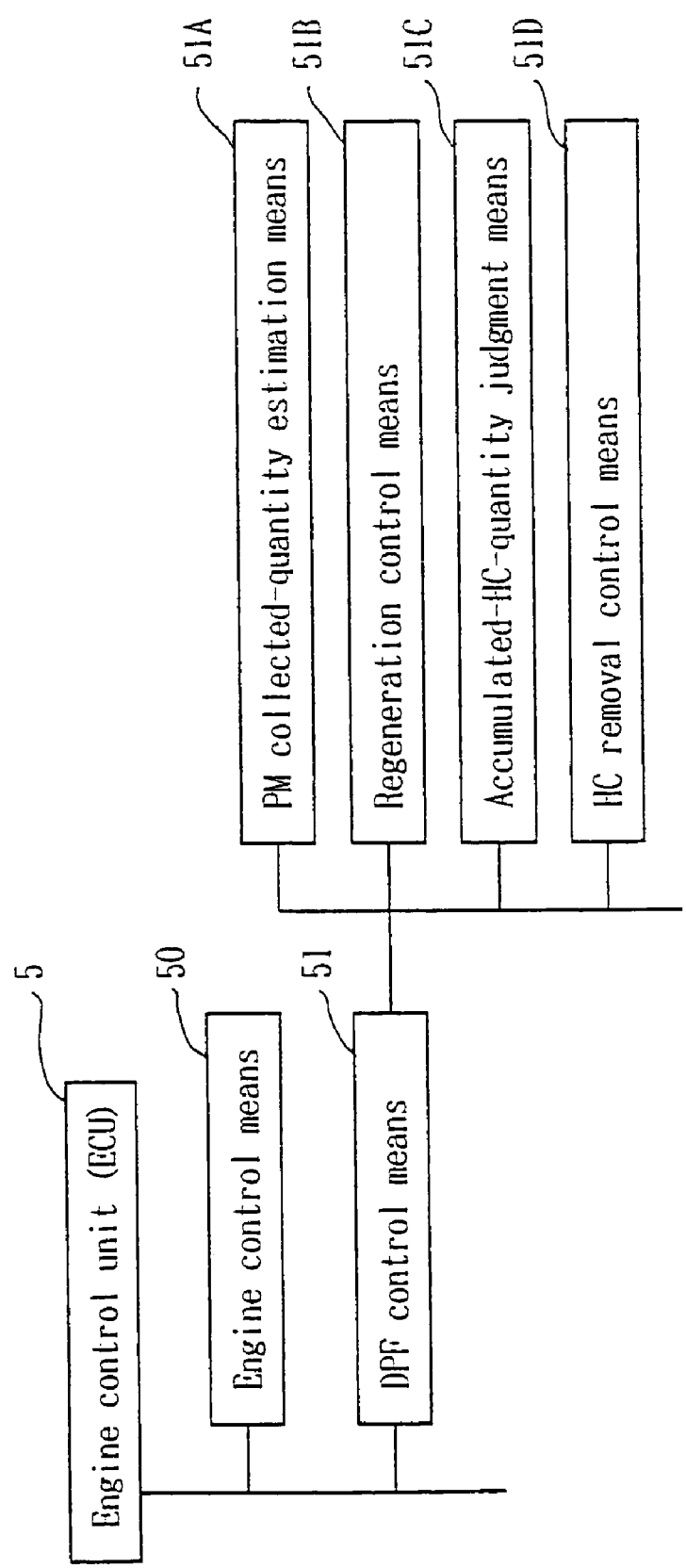
FIG. 3 is an illustration showing a configuration of a controller of an exhaust gas purifying system according to an embodiment of the present invention.

Moreover, in the case of the present invention, as shown in FIG. 3, an accumulated-HC-quantity judgment means (accumulated-hydrocarbon judgment means) 51C and HC removal control means (hydrocarbon removal control means) 51D are set to the DPF control means 51 of the controller 5 in addition to collected-PM-quantity estimation means 51A and regeneration control means 51B.

The collected-PM-quantity estimation means 51A serves as means for estimating the PM quantity collected in the catalyst-provided filter 3b of the continuous regenerating DPF system 3. The collected PM quantity is estimated by using the differential pressure $\Delta P$ between the upstream and the downstream of the catalyst-provided filter 3b and relating the differential pressure $\Delta P$ with the collected PM quantity.

Moreover, the regeneration control means 51B is executed when the differential pressure $\Delta P$ is equal to or more than a predetermined regeneration judgment value $\Delta Pa$. Though this means is slightly different in the way of controlling by the types of the continuous regenerating DPF system 3, it raises an exhaust gas temperature by delaying (retarding) the timing of the main fuel injection of the engine 1, performing a post fuel injection, or an intake throttling. Thereby, a temperature or an environment suitable for an oxidation and a removal of PM is realized to oxidize and remove the PM collected in the continuous regenerating DPF system 3.

Then, the accumulated-HC-quantity judgment means 51C serves as means for estimating the quantity of unburnt HC accumulated in the carrier of the oxidation catalyst 3a and judging whether the estimated accumulation quantity Vhc of the unburnt HC exceeds a predetermined judgment value Vhc0. This means judges whether the accumulated value of periods in which an internal combustion engine is kept in a low-exhaust-temperature state becomes a predetermined judgment value (accumulation time) tm1 or more, instead of judging whether the estimated accumulation quantity Vhc of the unburnt HC exceeds the predetermined judgment value Vhc0.

More accurately, it is preferable to measure the accumulation time of states in which the temperature of the oxidation catalyst 3a is kept at an activation temperature or lower. But it is difficult to measure directly the temperature of the oxidation catalyst 3a. Therefore, in this case, the temperature of the exhaust gas passing through the oxidation catalyst 3a is measured by the temperature sensor 7. Then, the accumulation time tm of the low exhaust gas temperature state in which the filter-inlet exhaust gas temperature T is lower than a predetermined temperature Tc is measured by a timer. When the measured time tm exceeds a predetermined accumulation time tm1, it is judged that the estimated accumulation quantity Vhc of the unburnt HC exceeds the predetermined judgment value Vhc0. The predetermined temperature (e.g. 250° C.) Tc is a temperature relating to a filter-inlet exhaust gas temperature Ts at which the temperature of the oxidation catalyst 3a becomes an activation temperature, which is decided by considering a relation between the temperature of the oxidation catalyst 3a and the filter-inlet exhaust gas temperature or a response speed for a control.

Moreover, the HC removal control means 51D raises the temperature of the exhaust gas when the accumulated-HC-quantity judgment means 51C judges that the estimated accumulation quantity of unburnt HC exceeds the predetermined judgment value Vhc0, continues a state in which the filter-inlet exhaust gas temperature T is higher than the predetermined temperature Tc for a predetermined judgment value (removal time) tm2 or longer and the oxidation catalyst 3a is activate, and the accumulated unburnt HC is oxidized to be removed.

Figure 4:
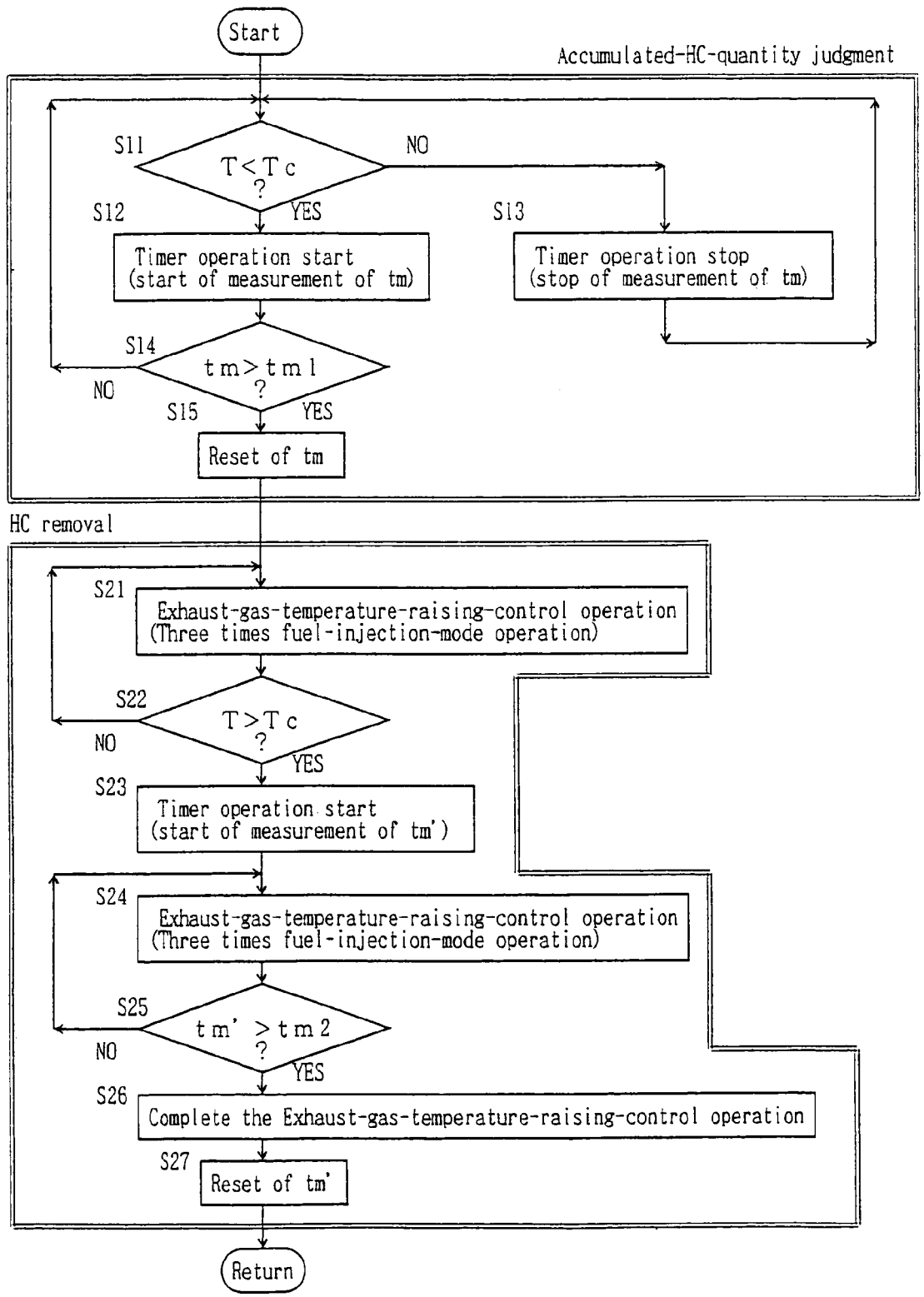
FIG. 4 is an illustration showing a flow of unburnt-HC related control.

According to the exhaust gas purifying system 10 having the above configuration, the continuous regenerating DPF system 3 performs unburnt-HC related control in terms of an accumulation, an oxidation and a removal of an unburnt HC in the oxidation catalyst 3a in accordance with the flow shown in FIG. 4.

The unburnt-HC related control, as shown in FIG. 4, is performed simultaneously with the normal filter-regenerating control for regenerating a filter when the collected-PM-quantity estimation means 51A or regeneration control means 51B judges that an estimated collected PM quantity exceeds a predetermined value. In this case, the accumulated-HC-quantity judgment means 51C judges an accumulated HC quantity first and then, the HC removal control means 51D removes the HC.

When the unburnt-HC related control starts, judgment on an accumulated HC quantity is started and it is judged in step S11 whether the filter-inlet exhaust gas temperature T is lower than the predetermined temperature Tc. When the temperature T is lower than the temperature Tc as a result of the above judgment, a timer operation is started in step S12, measurement of the accumulation time tm is started, and step S14 is started. When the temperature T is higher than the temperature Tc as a result of the above judgment, the timer operation is stopped in step S13 to restart step S11.

In step S14, it is judged whether the accumulation time tm when the filter-inlet exhaust gas temperature T is lower than the predetermined temperature Tc exceeds the predetermined accumulation time tm1. When the accumulation time tm does not exceed the time tm1 as a result of the above judgment, step S11 is restarted to measure the accumulation time tm in which the filter-inlet exhaust gas temperature T is lower than the predetermined temperature Tc. Moreover, when the time tm exceeds the time tm1, it is judged that the estimated accumulation quantity Vhc of unburnt HC exceeds the predetermined judgment value Vhc0, the timer is reset in step S15, and then the HC removal starts.

In the case of the HC removal, an exhaust-gas-temperature-raising-control operation is executed in step S21. The exhaust-gas-temperature-raising-control operation is an operation for raising an exhaust gas temperature by performing an idling-up operation or multistage-fuel-injection-mode operation.

Then, while an idling operation is performed, a target idling engine speed is increased to perform the idling-up operation and at the same time, the multistage-fuel-injection-mode operation is performed to raise the exhaust gas temperature. In the case of a low-load low-engine-speed operation other than the above case, the multistage-fuel-injection-mode operation is performed to raise the exhaust gas temperature.

Figure 5:
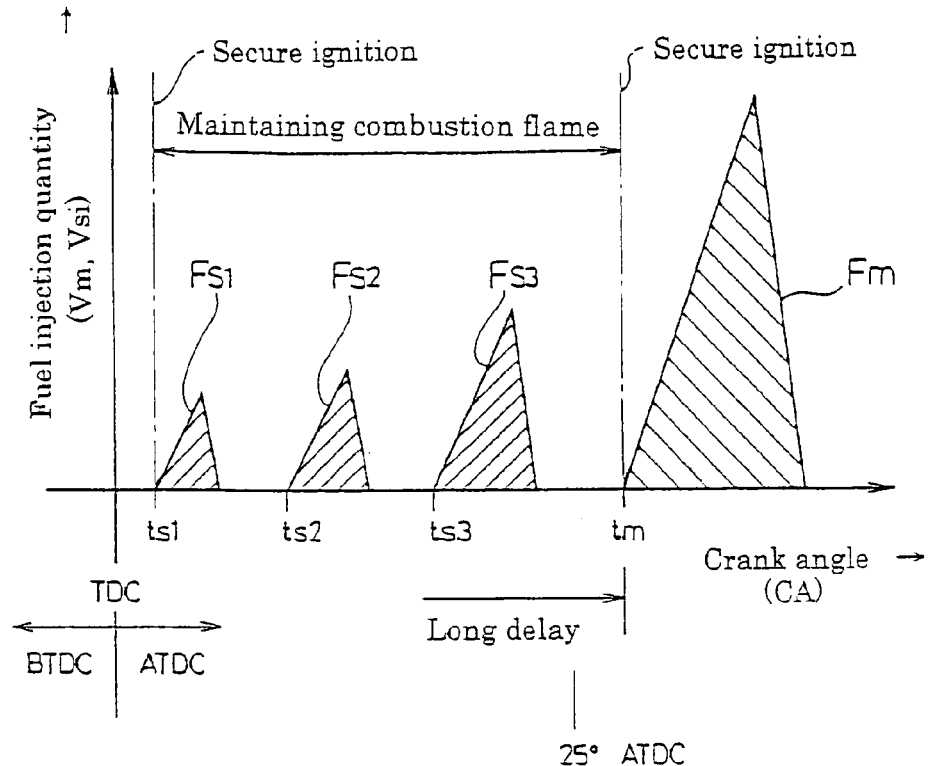
FIG. 5(a) is an illustration showing a case of performing auxiliary fuel injection three times in a multistage-fuel-injection-mode operation.
FIG. 5(b) is an illustration showing a case of performing auxiliary fuel injection five times in a multistage-fuel-injection-mode operation.
Figure 5:
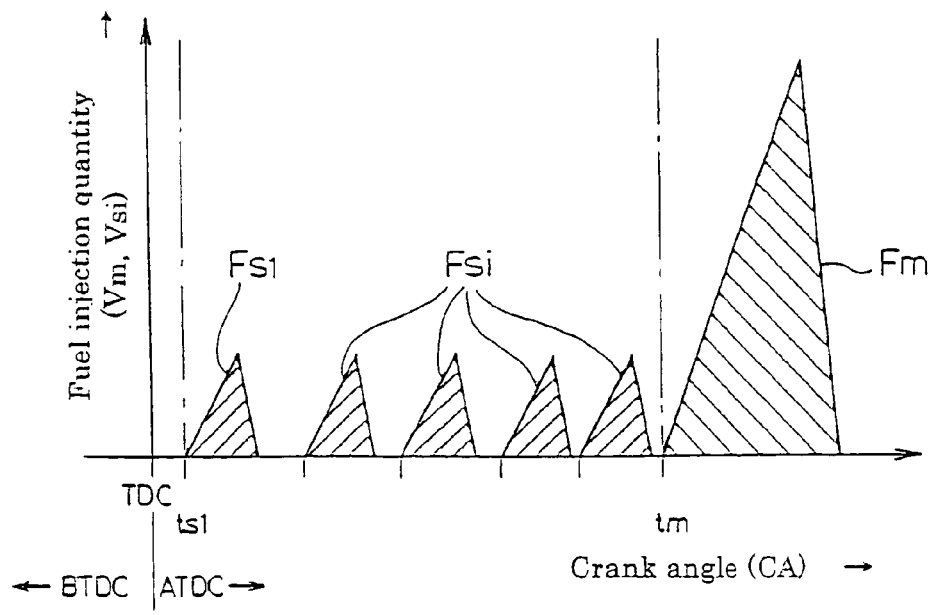

The multistage-fuel-injection-mode operation is a fuel injection control operation capable of greatly raising an exhaust gas temperature even under an engine operating condition in which an exhaust gas temperature is low such as an idling operation or very low-load operation. For example, as shown in FIG. 5, retarding the fuel injection period of the main fuel injection, auxiliary fuel injection in the period before the main fuel injection period is performed twice or more in order to maintain a combustion flame up to the main fuel injection period. The auxiliary fuel injection is performed at multistage (e.g. three stages).

An exhaust-gas-temperature-raising control operation is not restricted to the multistage fuel injection mode operation but it is allowed to use other fuel injection method or a method other than fuel injection. Moreover, it is possible to use a control same as the exhaust-gas-temperature-raising control in the regeneration control operation.

Then, in the next step S22, it is judged whether the filter-inlet exhaust gas temperature T is lower than the predetermined temperature Tc. When the temperature T is lower than the temperature Tc, step S21 is restarted to repeat the exhaust-gas-temperature-control operation in step S21 until the temperature T becomes higher than the temperature Tc. When the temperature T becomes higher than the temperature Tc, an operation of the timer is started in step S23, measurement of the continuous time tm is started, and then an exhaust-gas-temperature-raising-control operation is performed in step S24 and step S25 is started.

In step S25, it is judged whether a continuous time tm' (continuous time of HO removal) in which the filter-inlet exhaust gas temperature T is higher than the predetermined temperature Tc exceeds a predetermined removal time tm2. When the time tm' does not exceed the time tm2 as a result of the above judgment, step S24 is restarted. When the time tm' exceeds the time tm2 as a result of the above judgment, it is judged that removal of unburnt HO is completed to complete the exhaust-gas-temperature-raising-control operation in step S26 and the timer is reset in step S24 for return.

After the return, the unburnt-HC removal control is called again and started to repeat steps S11 to S27. The repetition is performed while an internal combustion engine is operated to monitor accumulation of unburnt HC in the oxidation catalyst 3a and remove the unburnt HC.

Figure 6:
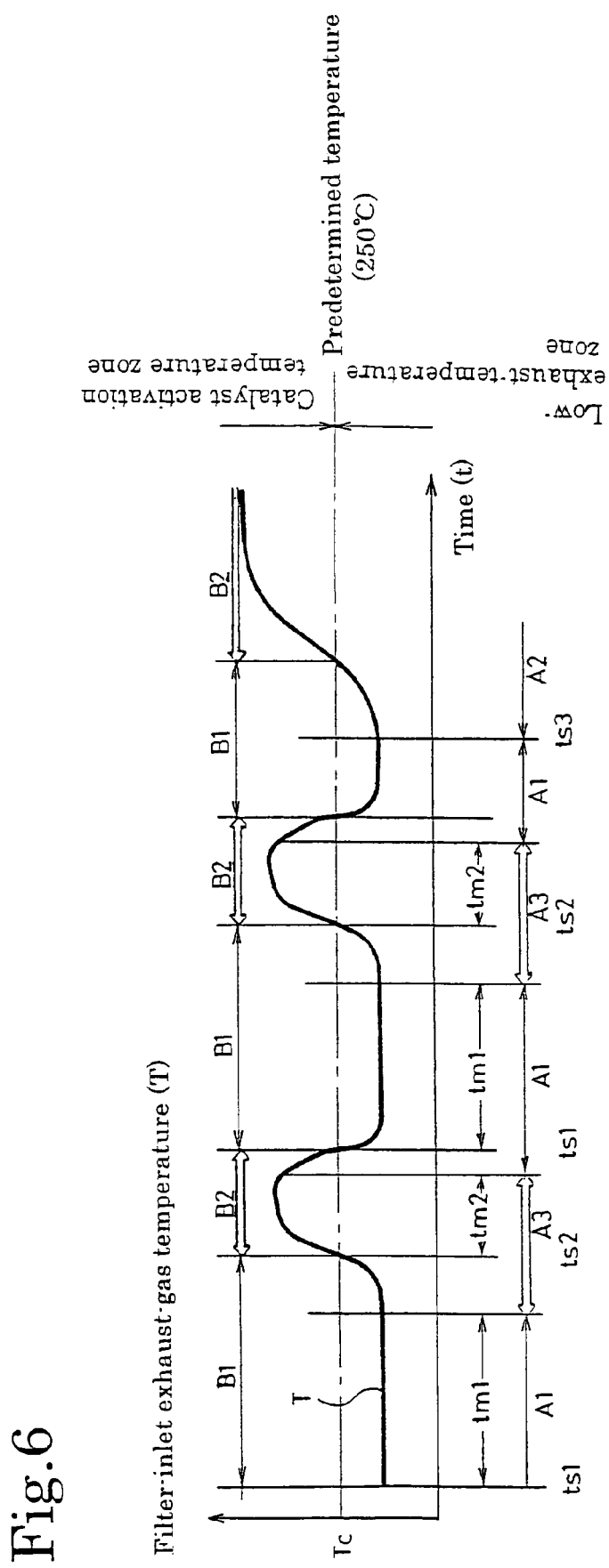
FIG. 6 is an illustration showing the time series and an exhaust temperature raising control of a filter inlet exhaust gas temperature in an exhaust gas purifying system according to an embodiment of the present invention.

As shown in FIG. 6, according to the above exhaust gas purifying method and the exhaust gas purifying system, it is possible to perform the exhaust-gas-temperature-raising-control operation until the operation exceeds the predetermined removal time tm2 whenever the low-exhaust-temperature state in which the filter-inlet exhaust gas temperature T is lower than the predetermined temperature Tc exceeds the predetermined accumulation time tm1. Thereby, it is possible to regularly remove the unburnt HC accumulated in the oxidation catalyst 3a in the low exhaust temperature state. In FIG. 6, the unburnt-HC-related control is interrupted when the high-load operation is started at ts3.

Therefore, it is possible to prevent white fume from being produced after a low exhaust temperature state of the idling operation or the like continues for a long time.

Figure 7:
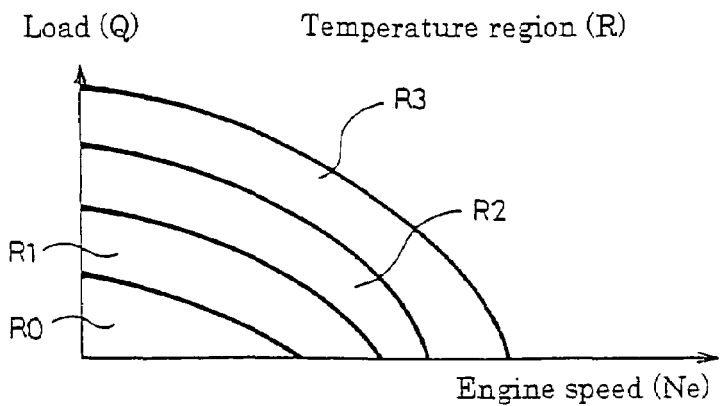
FIG. 7 is an illustration schematically showing a relation between load and engine speed of an internal combustion engine and temperature range of a filter inlet exhaust gas temperature.
Figure 8:
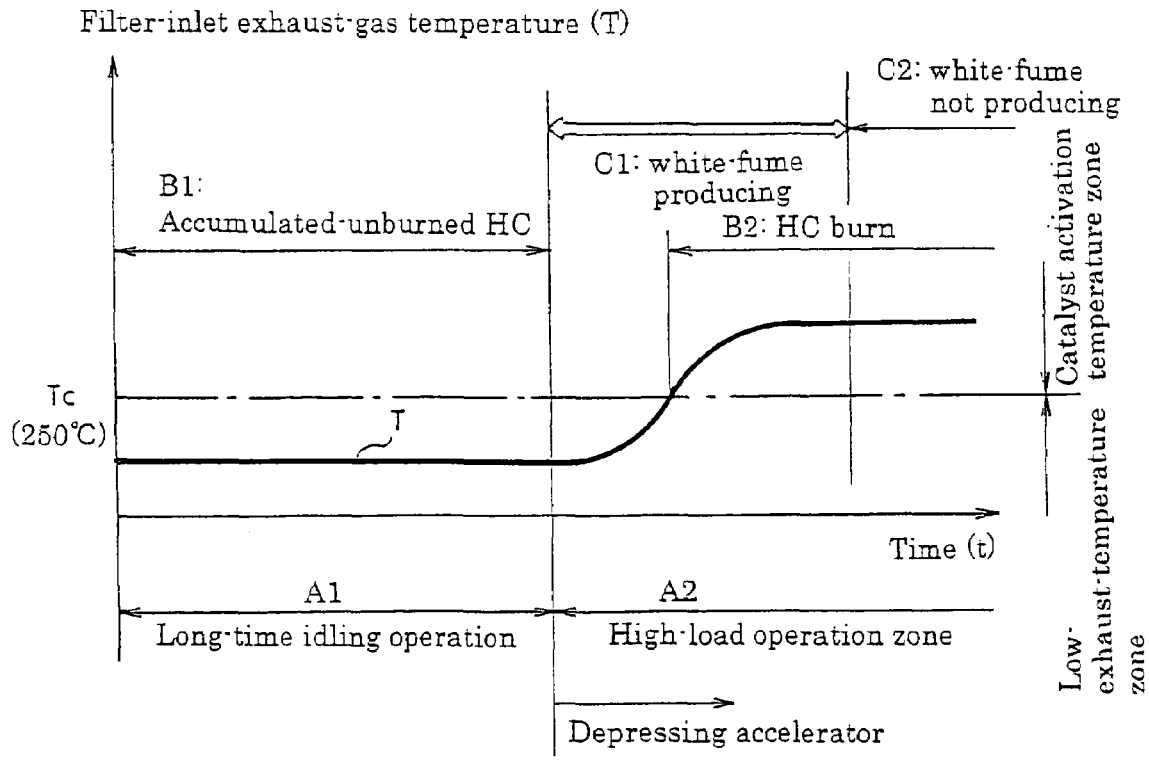
FIG. 8 is an illustration showing the time series of a filter inlet exhaust gas temperature and a white-fume producing state in a conventional exhaust gas purifying system.

FIG. 7 indicates the relation between load and engine speed of an engine and temperature region, and FIG. 8 shows the time series of a filter inlet exhaust gas temperature and a white-fume producing state in a conventional exhaust gas purifying system.

What is claimed is:

1. An exhaust gas purifying method for purifying exhaust gas of an internal combustion engine by an exhaust gas purifying system having an oxidation catalyst, comprising the steps of:
   estimating a quantity of a unburnt hydrocarbon accumulated in an oxidation catalyst carrier, raising an exhaust gas temperature by performing a hydrocarbon removal control to activate the oxidation catalyst, and oxidizing and removing the accumulated unburnt hydrocarbon, when the estimated accumulation quantity of the unburnt hydrocarbon exceeds a predetermined judgment value.

2. The exhaust gas purifying method according to claim 1, wherein a judgment is made as to whether an accumulated value of periods in which the internal combustion engine is kept in a low exhaust temperature state becomes a predetermined judgment value or more, instead of judging whether the estimated accumulated quantity of the unburnt hydrocarbon exceeds a predetermined judgment value.

3. The exhaust gas purifying method according to claim 1, wherein the hydrocarbon removal control raises an exhaust gas temperature by performing multistage fuel injection in the internal combustion engine.

4. The exhaust gas purifying method according to claim 1, wherein the exhaust gas purifying system has a continuous regenerating diesel particulate filter system.

* * * * *